United States Patent Office 3,782,896
Patented Jan. 1, 1974

3,782,896
SUBLIMATION TRANSFERRING HYDROXY OR AMINO-DIALKYLAMINO-DICYANOSTYRYL DYE AND DIISOCYANATE FIXATION OF DYED TEXTILE AND TRANSFER SHEETS THEREFOR
Raymond Defago, Riehen, Hans-Joerg Angliker, Basel, Herbert Holzrichter, Muri, Werner Kneubuehler, Binningen, and Richard Peter, Basel, Switzerland, assignors to Ciba-Geigy AG, Basel, Switzerland
No Drawing. Filed Apr. 19, 1972, Ser. No. 245,648
Claims priority, application Switzerland, Apr. 26, 1971, 6,069/71
Int. Cl. D06p 5/04
U.S. Cl. 8—2.5                              26 Claims

ABSTRACT OF THE DISCLOSURE

The invention relates to a process for the manufacture of prints which are fast to wet processings and sublimation on textile or non-textile sheets by means of the transfer printing process, wherein dyestuffs containing mercapto, hydroxyl and/or amino groups and applied to sheets by means of the transfer printing process are fixed by the action of isocyanates or masked isocyanates, which are applied to the sheets before, during, or after the dyestuff transfer.

---

It is known to print textile materials that are in the form of webs by means of textile printing machines that have engraved printing rollers. Very recently, the so-called transfer printing has become known, wherein the dyestuffs are transferred onto the textile substrate by diffusion and sublimation from printed intermediate or auxiliary carriers, chiefly paper webs. Such transfer printing processes are described in French Pat. No. 1,223,330 and in Swiss Pat. No. 476,893.

Since dyestuffs which are more or less easily sublimable and with not too high a molecular weight are used for this process, the fabric prints obtainable by means of the transfer printing are not particularly fast to ironing and migration.

The discovery has now been made that, notwithstanding, it is possible to obtain fast prints by applying to the fibres beforehand, simultaneously or afterwards, chemical fixing agents which react chemically with the transferred dyestuffs.

The invention therefore relates to a process for the manufacture of prints which are fast to wet processings and sublimation on textile or non-textile sheet materials by means of the transfer printing process, characterized in that the sheet materials are printed with disperse dyestuffs containing mercapto, hydroxyl and/or amino groups by the transfer printing process and fixed by the action of isocyanates or masked isocyanates.

Suitable fibre materials are those from cotton and wool and preferably from hydrophobic synthetic fibres, for example acrylic fibres of polyacrylonitrile and copolymers of acrylonitrile and other vinyl compounds, such as acrylic esters, acrylic amides, vinyl pyridine, vinyl chloride or vinylidene chloride, copolymers of dicyanoethylene and vinyl acetate, fibres of polyurethane, polyolefines, cellulose tri-acetate and cellulose 2½-acetate, polyamides, such as nylon 6, nylon 66 or nylon 12, and in particular, fibres of aromatic polyesters, for example those from terephthalic acid and ethylene glycol or 1,4-dimethylolcyclohexane and copolymers of terephthalic and isophthalic acid and ethylene glycol.

The fixing of dyed hydrophobic synthetic textile material is distinguished primarily in that the fixing of the dyestuff in the solution of the dyestuff takes place in the fibre itself, since fibres such as polyester, acrylic and synthetic polyamide fibres, do not contain the disperse dyestuffs in aggregate form, but in the form of a solution.

The disperse dyestuffs present on the wool fibres or dissolved in the hydrophobic, fully synthetic fibres, contain either hydroxyl groups and/or primary or secondary amino groups which react basically and are able to react with the isocyanates. The disperse dyestuffs contain preferably at least one primary or secondary amino group.

Particularly preferred dyestuffs are those which contain both hydroxyl and amino groups.

The dyestuffs may belong to the most diverse dyestuff classes, for example the classes of perinone, quinophthalone, nitro, stilbene and methine dyestuffs, including the styryl, azamethine, polymethine and azostyryl dyestuffs. Preferably they belong to the azo series, such as the mono- or disazo series, to the anthraquinone series.

Suitable disperse dyestuffs are, for example, those of the following formulae:

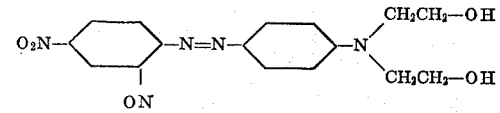

obtained by diazotizing 2-cyano-4-nitroaniline and coupling with N-bis-(β-hydroxyethyl)-aniline;

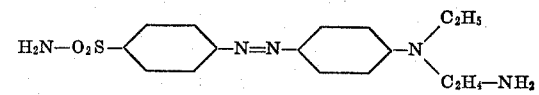

obtained by diazotizing p-amidosulphonylaniline and coupling with N-ethyl-N-β-aminoethyl-aniline;

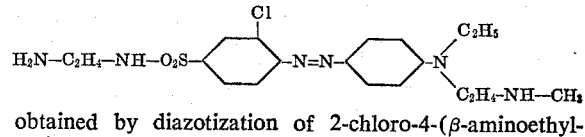

obtained by diazotization of 2-chloro-4-(β-aminoethyl-amidosulphonyl)-aniline and coupling with N-ethyl-N-β-methylaminoethyl-aniline;

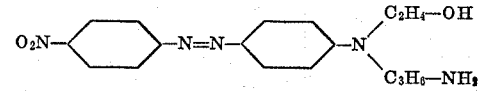

obtained by diazotization of p-nitro-aniline and coupling with N-β-hydroxyethyl-N-γ-aminopropylaniline;

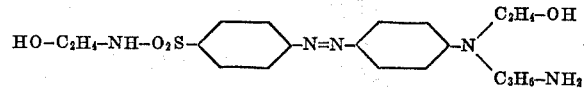

obtained by diazotization of 4-(β-hydroxyethylamidosulphonyl)-aniline and coupling with N-β-hydroxyethyl-N-γ-aminopropylaniline;

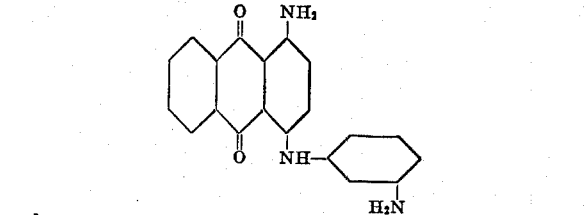

and

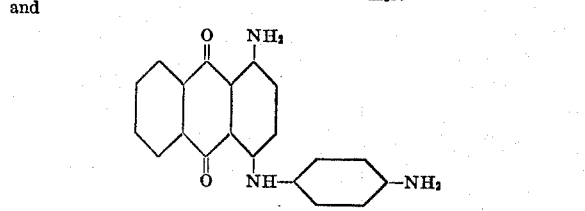

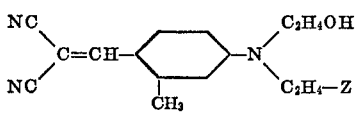

wherein Z represents a hydroxy or acetyloxy group or a hydrogen or chloride atom,

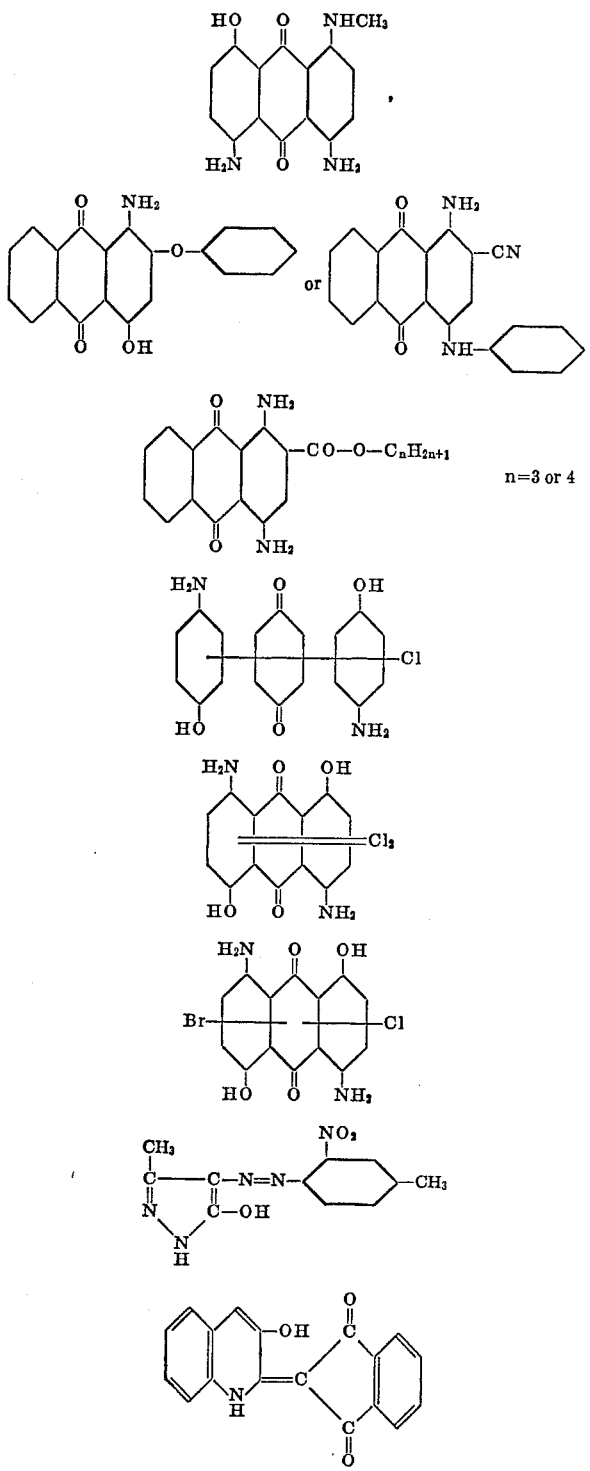

2-hydroxy-5-methyl-4'-acetylaminobenzene

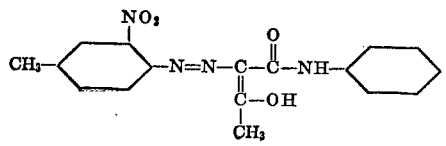

The treatment with the isocyanates can be carried out in such a manner that the isocyanate acts upon the fabric in vapor form before, during or after the transfer of the dyestuff. It is also possible to apply the isocyanate by means of prior padding.

To fix the dyestuff, the alkyl- and arylisocyanates and heterocyclic isocyanates are used, for example methylisocyanate, ethylisocyanate, n-propylisocyanate, n-butylisocyanate, octylisocyanate, methylisocyanate acetate, butylisocyanate acetate, cyclohexylisocyanate, phenylisocyanate, p-tolylisocyanate, o-, m- and p-chlorophenylisocyanate, m- and p-nitrophenylisocyanate, 2,5-dichlorophenylisocyanate, o- and p-methoxyphenylisocyanate, 2-naphthylisocyanate, 2 - bisphenylylisocyanate, 2 - isocyanatotetrahydropyrane, tetrahydrofurfurylisocyanate, 3-isocyanatopyridine, 2-furylisocyanate, 3 - isocyanato - N-ethylcarbazole and, preferably, isocyanates of sulphur-containing heterocycles such as 2-carbomethoxy-3-isocyanatothiophene,
2-isocyanato-3-cyanothiophene,
2-isocyanato-3-carbomethoxy-4-methyl-thiophene,
2-isocyanato-5-methylthiophene-3-carboxylic acid amide,
2-isocyanato-3-carbomethoxy-4,5-dimethylthiophene,
2-isocyanato-3-carboethoxy-4,5-tetramethylene-thiophene, and
3-isocyanatosulpholane.

Particularly good fastness properties are obtained by using di- and multivalent isocyanates, for example hexamethylenediisocyanate,
tetramethylenediisocyanate,
ethylenediisocyanate,
N,N'-bis-(4-methyl-3-isocyanato-phenyl)-urea,
cyclohexane-1,4-diisocyanate,
isophorone-diisocyanate,
1,2,3,4,5,6-hexahydro-diphenylmethane-4,4'-diisocyanate, as well as aromatic diisocyanates such as toluene-2,4-, 2,5- or 2,6-diisocyanate or mixtures thereof, phenylene-1,4-diisocyanate,
bis-(4-methyl-3-isocyanatophenyl)-carbodiimide,
diphenyl-4,4'-diisocyanate,
diphenylmethane-3,3'-diisocyanate,
diphenyl-dimethylmethane-4,4'-diisocyanate,
stilbene-4,4'-diisocyanate,
benzophenone-4,4'-diisocyanate,
diphenylether-
or diphenylsulphide-diisocyanate, as well as their substitution products, e.g. derivatives substituted with alkyl, alkoxy, halogen or nitro groups, such as, e.g. 3,3'-dimethyl- or 3,3'-dimethoxy- or 3,3'-dichloro-diphenylmethane-4,4'-diisocyanate. Also cited as examples are diisocyanates of the naphthalene series, such as naphthylene-1,5-diisocyanate, or heterocyclic diisocyanates, e.g. of benzofuran, or diisocyanates containing urea and uretdione groups, such as 1,3-bis-(4'-methyl-3'-isocyanato-phenyl)-uretdione.

For preference, ordinary commercially available diisocyanates are used, for example, 1,6-hexamethylene-diisocyanate or mixtures thereof.

Particularly advantageous is the use of isocyanates in the form of so-called "masked isocyanates." This class of substances, which is unitary in its chemical function, consists of chemical derivatives of isocyanates which decompose into free isocyanates only on the application of heat or in the presence of special activators. The free isocyanates then react in the desired manner with the dyestuffs, which are either on or in the fibres, and fix these chemically.

Suitable masked isocyanates are: isocyanates in the form of their decomposition products with alcohols, phenols, thiols, carboxylic acid, hydrocyanic acid, amines, oximes, carboxylic amides and sulphonamides, ureas, urethanes, methylene-active compounds, bisulphites, cyanamide and dimeric isocyanates.

Such products are described in the literature (cf. Angew. Chemie, col. 49, pp. 257–288 (1947), Liebigs Annalen, vol. 562, pp. 205–299, Ullmann, Encyclopädie der Technischen Chemie, vol. 14, p. 341, 3rd ed.). Exemplary of such masked isocyanates are:

$C_2H_5OCONH(CH_2)_6NHCOOC_2H_5$

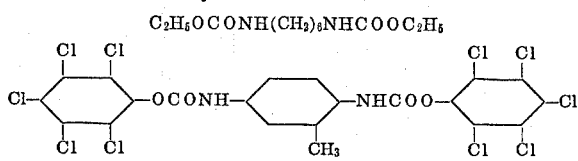

$(C_2H_5OCO)_2CHCONH(CH_2)_2NHCOCH(COOC_2H_5)_2$ $(C_2H_5OCO)_2CH-CO-NH(CH_2)_6NHCOCH(COOC_2H_5)H_5)_2$ $(C_2H_5OCO)_2CH-CO-NH(CH_2)_4NHCOCH(COOC_2H_5)_2$

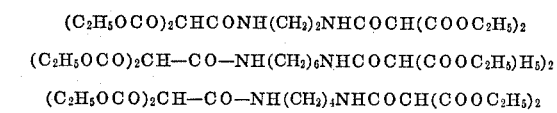

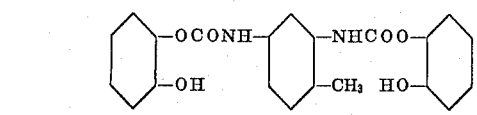

$NaO_3SCONH(CH_2)_6NHCOSO_3Na$

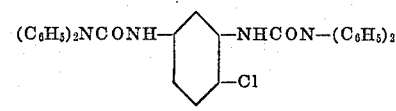

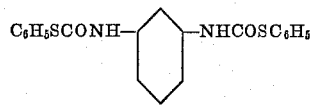

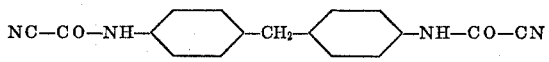

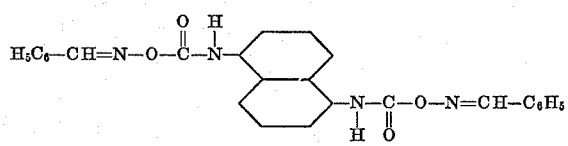

$CH_3-COOCO-NH(CH_2)_6NH-COOCO-CH_3$

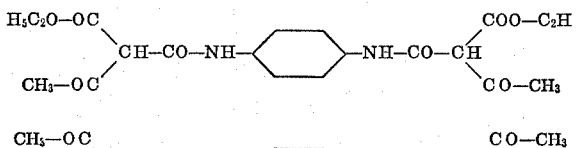

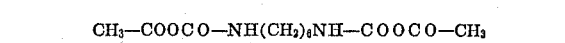

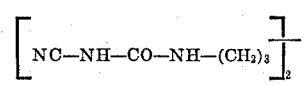

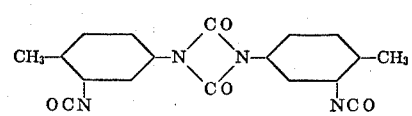

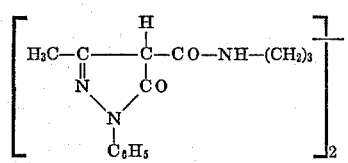

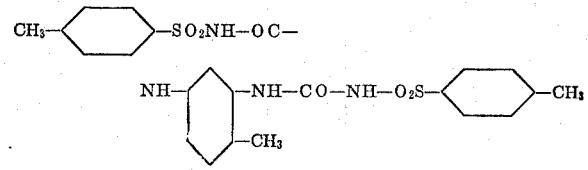

[Bis(benzoesäure-1,2-sulfimid-N-carbonsäure)-hexamethylendiamid]

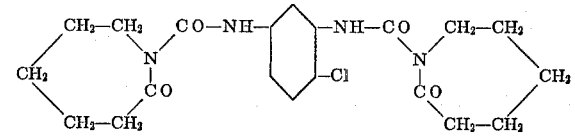

It is possible, for example, to impregnate or coat carrier sheets or papers with such masked isocyanates (preferably in the form of finely divided printing pastes which contain from 50 mol percent to 500 mol percent, preferably from 200 mol percent to 400 mol percent, relative to the dyestuff used, of the isocyanate compound in a preferably organic medium which boils at 1 atmosphere pressure below 220° C.) and then, exactly as in the transfer printing process, to apply the isocyanate which is split off at elevated temperature to the sheet material to be printed. This can be done before the printing with the dyestuff, if the conditions are so chosen that the isocyanate remains for a sufficient length of time on the sheet material in order to fix the dyestuff. It is also possible to apply the isocyanate by transfer or by padding after the printing with the dyestuff.

A further particularly interesting possibility consists in printing the auixilary sheets or papers, which are printed with the dyestuff, with a masked isocyanate which liberates the isocyanate at a temperature at which the dyestuff has already been transferred to the sheet material to be printed, so that, after the actual transfer printing, it is only necessary to raise the temperature so as to liberate the isocyanate and fix the dyestuff.

During the treatment with isocyanates it is advantageous to add basic and other accelerating catalysts, for example tertiary organic amines, such as hexahydro-N,N-dimethyl-aniline, tribenzylamine, N-methyl-piperidine, N,N'-dimethylpiperazine, alkali or alkaline earth hydroxides, heavy metal ions, such as iron(III), manganese (III), vanadium(V) or metal soaps such as lead oleate, lead-2-ethylhexanoate, zinc(II)octanoate, lead and cobalt naphthenate, zinc(II)-ethylhexanoate, and also bismuth, antimony and arsenic compounds, for example tributyl arsenic, triethylstibine oxide or phenyldichlorostibine.

It is also possible to add to the reaction of the isocyanates retarding substances, for example sulphur dioxide and boric acid or compounds which form acid fission products, such as carboxylic acid chlorides, butadienesulphonic and boric acid alkyl esters.

The other dyestuffs whose conjoint use is optional may be any kind of dyestuffs and/or fluorescent whitening agents which are not capable of reacting with isocyanates and are suitable for the transfer printing on account of their sublimation and diffusion behavior, for example disperse dyestuffs of the following chemical classes: anthraquinoid dyestuffs, azo dyestuffs, quinonaphthalone dyestuffs, styryl dyestuffs or nitrodiarylamines, for example dyestuffs of the following formula:

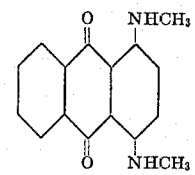

Suitable fluorescent whitening agents are primarily mono- and bisazole as well as benzoxazole derivatives, for example the fluorescent whitening agents of the formula:

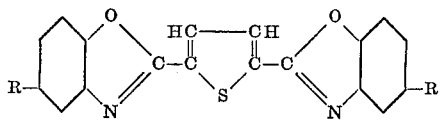

wherein R is hydrogen, isopropyl, methyl, tert.butyl.

Suitable sublimable dyestuffs within the purport of the invention are those dyestuffs and chromogenic substances which, in conformity with the "Process for Determining the Fastness to Dry Heat Setting and Fastness to Pleating of Dyeings and Prints (Dry Heating)" of the Swiss Standards Institute, Standard Specification SNV 95 8 33/1961, yield a tinctorially adequate surface bleeding (staining). In the case of Standard Specification SNV 95 8 33/1961, a sample of the dyed material is heated for 30 seconds under a pressure of 40 g.±10 g. per cm.$^{-2}$ at specified test temperatures in close contact with an undyed material for which the dyestuff shows a good affinity according to traditional methods.

In selecting the dyestuffs suitable for the process according to the invention, however, a printed or dyed auxiliary substrate such, for example, as paper is used instead of the dyed material.

In the process, the temperature conforms up to the thermal resistance or according to the behavior of flow of the substrate to be printed in the transfer process. The process is thus carried out, for example, in the case of soft PVC at temperatures ranging approximately between 80 and 140° C., in the case of polypropylene at temperatures ranging approximately between 120 and 155° C. and in the case of wool at temperatures ranging approximately between 160° and 220° C. Depending on the substrate, the process is also carried out at temperatures lower than 80° C. or at temperature higher than 220° C. if there merely results a tinctorially adequate surface bleeding (staining) on the substrate in contact with the dyestuff on the auxiliary carrier.

According to the invention, dyestuffs are also used that adequately stain (dye) the undyed substrate after a heating period of less than 30 seconds and up to 2 minutes and/or both at lower and at higher contact pressure than that specified in the Standard Specification, or also without contact pressure.

It is here quite immaterial whether the dyestuff sublimes in the physical sense or penetrates the substrate in some state other than the gaseous state, if it only migrates from the auxiliary carrier onto the substrate.

The substrates may be in the most diverse forms, but preferably in the form of sheet materials, for example woven and knitted fabrics, non-wovens, which may be in the form, for example, of webs or ready-made goods, also carpets, foils, papers etc. It is also possible to print bottles and cans.

It is also possible to print blends of these materials with one another, i.e. both those from purely synthetic, hydrophobic fibers and those from natural and synthetic fibers.

The intermediate or auxiliary carriers necessary for the transfer printing can be any kind of structures, preferably non-textile ones, for preference sheet materials based on cellulose, chiefly paper, but also sheets of regenerated cellulose, which can be printed single or multi-colored in the desired pattern or completely with aqueous, aqueous-organic but in particular with virtually anhydrous printing inks, solutions, dispersions or emulsions. Suitable carrers are also metal sheets; but chiefly paper is used as carrier.

The dyestuffs are applied and dried by printing, but this can also be done by impregnating or dyeing the intermediate carrier in the dyestuff solution or dispersion (for example, in a dye bath).

The intermediate carriers can also be printed on both sides, in the process of which dissimilar dyes and/or patterns can be selected for the two sides. In order to avoid using a printing machine, the printing inks can be sprayed onto the auxiliary carrier, for example by using a spray gun.

Particularly interesting effects are obtained if more than one shade is printed or sprayed onto the auxiliary carrier simultaneously. In the process, certain patterns can be obtained, for example by using stencils, or artistic patterns can be produced by using a brush. If the auxiliary carriers are printed, the most diverse forms of printing techniques can be employed, for example the planographic process (e.g. offset), the relief-printing process (e.g. book cylinder printing, rotary gravure, print engraving), soft-ground etching (e.g. silk screen, film printing).

A particular embodiment of the transfer process consists in applying, instead of a complete web, only pieces of the carrier to the material to be printed.

These pieces are obtained by punching or cutting the above-mentioned printed or dyed intermediate carriers into suitably formed segments, for example into flowers, rings, triangles, circles, stars, stripes and so forth. The undyed intermediate carrier pieces can also be dyed or impregnated with the dyestuff(s), for example by dipping them into an appropriate dyestuff solution or dispersion.

These paper pieces are then scattered manually or by means of a suitable mechanical device onto the material to be printed and the whole is subsequently heated to the sublimation or diffusion temperature in a suitable device, for example an ironing process.

The two sides of a woven fabric, knitted fabric or fleece can be printed simultaneously or successively with identical or different patterns. It is also possible to apply a complete paper web, impregnated with the dyestuff, over the top of the scattered pieces of paper to be printed, and in this way a reserve effect is achieved in which the reserved areas are simultaneously printed.

A special resist effect is obtained if undyed pieces, for example paper pieces, are used together with, or optionally instead of, the colored intermediate carrier pieces. It is also possible to place the pieces of intermediate carrier between two textile webs and in this way to print both textile webs simultaneously.

On using dispersions, the dyestuffs dispersed in the printing color must in the main have a particle size of $\leq 10\mu$, preferably $\leq 2\mu$. Besides water, practically all organic solvents are possible that boil at atmospheric pressure at temperatures below 220° C., preferably below 150° C., and which possess sufficient dissolving or dispersing power for the dyestuffs used and sufficient dissolving or emulsifying power for the binders to be used. Exemplary of organic solvents that may be used are: aliphatic and aromatic hydrocarbons, for example n-heptane and benzene, xylene or toluene; halogenated hydrocarbons, for example methylene chloride, trichloroethylene or chlorobenzene, nitrated aliphatic hydrocarbons, for example nitropropane, aliphatic amides, for example dimethylformamide or mixtures thereof; furthermore, glycols, for example ethylene glycol or polyethylene glycol-monoethylether or polyethylene glycol-diethylether, diethylcarbonate, dimethylcarbonate or esters, for example ethyl acetate, propylacetate, butylacetate, β-ethoxyethyl acetate; aliphatic or cycloaliphatic ketones, for example methylethyl ketone, methylisobutyl ketone, cyclohexanone, isophorone, mesityloxide or diacetone alcohol; mixtures of an aliphatic ketone, for example methylethyl ketone, and of an aromatic hydrocarbon, for example toluene; and alcohols, for example methanol, ethanol and preferably n-propanol, isopropanol, n-butanol, tert.-butanol, sec.-butanol or benzylalcohol; furthermore, mixtures of several solvents are possible that contain at least one solvent from one of the above named classes. Printing inks that are practically anhydrous are used with advantage.

Especially preferred solvents are esters, ketones or alcohols, for example butyl acetate, acetone, methylethyl ketone, ethanol, isopropanol or butanol.

In addition to the dyestuff or brightener and solvent (diluent), the printing colors (inks) to be used according to the invention also contain preferably at least one binder, which acts on the material to be printed as thickener of the printing color and at least as temporary binder of the dyestuff. Synthetic, semi-synthetic and natural resins, which is to say both polymerization as well as polycondensation and polyaddition products, are suitable as such binders. In principle, all resins and binders customary in the printing ink and paint industry, for example those described in the lacquer raw material tables of Karsten (4th ed., Hanover, 1967) and in Wagnes and Sarx's work on lacquer resins (4th ed., Munich, 1959), are used. Preferably, in the case of solvent-based printing inks, physically drying resins are used, i.e. resins that do not react (or cross-link) in the atmosphere or with each other chemically, but leave behind a dry film after the solvent has been removed. The use of resins that are soluble in the solvents used is advantageous.

In the case of printing inks that are solvent-free or contain but little solvent, it is preferable to use chemically drying binding agents, for example oxidatively drying oils, oil varnishes and oil-modified alkyd resins, or two or more components that react chemically with each other.

The following, for example, are suitable resins: colophonyl and derivatives thereof, hydrogenated colophonyl, di- or polymerized colophony, with colophonyl esterified with mono- or polyvalent alcohols; with resinifiers such as acrylic acid and butane diol or maleic acid and pentaerythritol modified colophony resin; the soluble phenol resins modified with colophonyl and resins based on acrylic compounds, maleinate resins, oil-free alkyd resins, styrolated alkyd resins, vinyl toluene modified alkyd resins, alkyd resins with synthetic fatty acids, linseed oil alkyd resins, ricinene alkyl resins, castor oil alkyd resins, soy oil alkyd resins, cocoanut oil alkyd resins, tall oil and fish oil alkyd resins, acrylated alkyd resins, also oils and oil varnishes. Also suitable are terpene resins, polyvinyl resins such as polyvinyl acetate, polyvinyl chloride, polyvinylidene chloride, polyvinyl acetals, polyvinyl alcohol, polyvinyl ether, copolymers and graft polymers with various vinyl monomers, polyacrylic resins, acrylate resins, polystyrenes, polyisobutylenes, polyesters based on phthalic acid, maleic acid, adipic acid, sebacic acid etc., naphthalene formaldehyde resins, furane resins, ketone resins, aldehyde resins, polyurethanes (especially urethane precondensates that cure only at elevated temperature), epoxide resins (especially resin-curing agent mixtures that cure only at elevated temperature) and precondensates thereof. Suitable too are primary-products of unsaturated polyester resins, dialkylphthalate-prepolymers, polyolefins such as polyethylene wax or polypropylene wax, indene and coumaronindene resins, carbamide and sulphonamide resins, polyamide and polyester resins, silicon resins, rubber and derivatives thereof, for example cyclorubber and chlorinated rubber, chiefly, however, cellulose derivatives such as cellulose esters (nitrocellulose, cellulose acetate and the like), and especially cellulose ethers, for example methylcellulose, hydroxyethylcellulose, hydroxypropylcellulose, propionitrile cellulose, ethyl cellulose and benzylcellulose. The corresponding derivatives of other polysaccharides can also be used.

The printing colors (solutions, dispersions, emulsions) manufactured by usual methods with the resins, dyestuffs, solvents or lithographic varnishes mentioned are applied directly to the auxiliary carrier to be printed.

In order to improve the suitablity of the printing inks, optional components can be added, for example plasticizers, swelling agents, high boiling solvents such as for example, as Tetralin or Decalin, ionic or non-ionic surface-active compounds such, for example, as the condensation product of $\beta$-naphthalenesulphonic acid with formaldehyde, partially desulphonated lignin sulphonate, or the condensation product of 1 mol octylphenol with 8 to 10 mols ethylene oxide.

The quantitive composition of the printing colors with respect to resin mixture and solvent mixture is determined by two requirements.

Where solvents are used, they must be present in such amounts that the resin remains dissolved and/or dispersed, and on the other hand, the amount of the solvent must be within such limits that the viscosity of the printing color has the necessary value for carrying out the printing process. Thus, for example, in gravure printing good results are obtained as a rule by using a proportion of resin:solvent that lies between 1:1 and 1:50, preferably between 1:3 and 1:20.

Water-soluble thickeners such, for example, as polyvinyl alcohol, carob bean flour, methyl cellulose or water-soluble polyacrylates are used in aqueous inks.

To manufacture printing inks or dyeing dispersions, dyestuff preparations can be used that contain the dyestuffs mentioned above and a carrier resin. Such preparations possess the advantage that they contain the dyestuffs already in very finely divided form so that a milling or grinding process for the manufacture of the printing inks is superfluous. Printing inks that are ready for use are obtained with such preparations by merely stirring these in solvent or solvent/binding agent systems.

It is preferable to use the above named cellulose derivatives as resin, especially the ethers.

The transfer printing is carried out in the usual way. To this end, the carriers are brought into contact with the textile or non-textile sheet materials and maintained at sublimation or diffusion temperature for as long as it takes the dyestuffs applied to the auxiliary carrier to be transferred onto the textile material. As a rule a brief heating (10 to 60 seconds) to 150 to 220° C. suffices for this purpose. Transfer prints are also possible at lower temperatures, for example on polyvinyl chloride at 100° C. The transfer printing may be carried out continuously on, for example, a heated roller or also by means of a heated plate (flat iron or warm press), or by using steam or dry warm air, under atmospheric pressure or in vacuo.

If the transfer printing is carried out by means of steam, the steam jet can, for example, be sent through the organ that presses against the substrate to be printed, or it can be sent through the substrate to be printed, for which purpose perforated cylinders, for example, can be used.

The following examples illustrate the invention. In the examples, the parts, unless otherwise stated, denote parts by weight and the percentages denote percentages by weight. The relationship between parts by weight and parts by volume is the same as that between the gram and millilitre.

EXAMPLE 1

(a) 1 part of yellow dyestuff of the formula

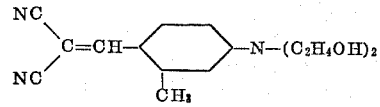

10 parts of ethyl cellulose (Ethocel E 7, Dow Chem.), 42.5 parts of ethanol and 42.5 parts of methyl ethyl ketone are ground for 4 hours in a sand mill while cooling. Upon isolation of the sand from the ground product, a printing ink with very good fine division of the dyestuff is obtained. The printing ink obtained is imprinted on paper, providing a suitable intermediate carrier paper for the transfer printing process.

(b) 5 parts of a masked diisocyanate of the formula $(H_5C_2OOC)_2$—CH—CO—NH$(CH_2)_6$
—NH—CO—CH—$(COOC_2H_5)_2$ (manufactured according to Liebigs Annalen der Chemie, 562, 205, 1949) and 95 parts of tetrachloroethylene are ground for 5 hours in a sand mill while cooling. Upon isolation of the sand from the ground product, a printing paste with very good fine distribution of the diisocyanate is obtained.

The printing paste obtained is imprinted on paper, thus providing an intermediate carrier paper suitable for the transfer printing process.

(c) The dyestuff of the intermediate carrier paper obtained according to Example 1(a) is transferred to polyethylene terephthalate fabric on an ironing press for 60 seconds at 220° C. A yellow print with insufficient fastness to sublimation is obtained. The diisocyanate compound of the intermediate carrier paper obtained according to Example 1(b) is transferred for 60 seconds to the resulting print. The transferred diisocyanate compound reacts with the dyestuff to give a yellow print of very good fastness to sublimation, light and wet processings.

EXAMPLE 2

In a manner analogous to Examples 1(a) and 1(b) intermediate carrier papers are manufactured with the red dyestuff of the formula

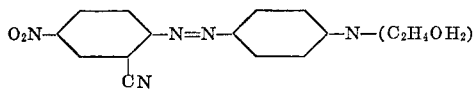

and the transfer process is carried out on polyacrylonitrile fabric analogously to Example 1(c). A red print having excellent fastness to dry heat is obtained.

EXAMPLE 3

In a manner analogous to Examples 1(a) and 1(b) intermediate carrier papers are manufactured with the yellow dyestuff of the formula

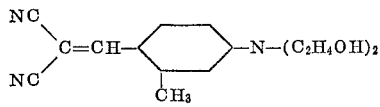

Firstly, and proceeding in a manner analogous to Example 1(c), the diisocyanate compound is transferred to polyethylene terephthalate fabric; then the dyestuff of the intermediate carrier paper obtained according to Example 1(a) is transferred. A yellow print having very good fastness to dry heat is obtained.

EXAMPLE 4

In a manner analogous to Examples 1(a) and 1(b) intermediate carrier papers are manufactured with the red dyestuff of the formula

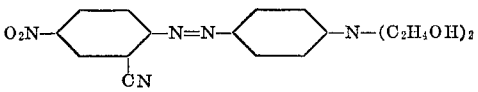

and the transfer process is carried out on cellulose fabric. A print having excellent fastness to dry heat is obtained.

EXAMPLE 5

Red prints are obtained on polyamide fibers by the same process as described in Example 4.

A similar procedure is used for prints on wool, the sole difference being that the process is carried out at lower temperatures.

EXAMPLE 6

A polyethylene terephthalate fabric is impregnated with a solution or suspension of a diisocyanate

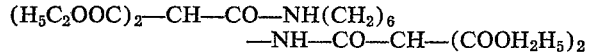

(50 g./l.) in tetrachloroethylene at room temperature, squeeed out and dried in the air. The dyestuff of the intermediate carrier paper obtained according to Example 1(a) is then transferred to this polyethylene terephthalate fabric on an ironing press for 60 seconds at 220° C. The transferred dyestuff reacts with the diisocyanate and a yellow print having very good fastness to dry heat setting is obtained.

EXAMPLE 7

1 part of the yellow dyestuff of the formula

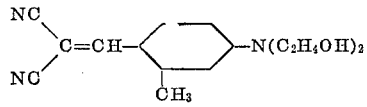

5 parts of a masked diisocyanate of the formula

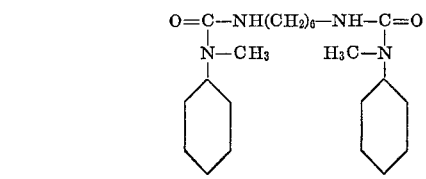

10 parts of ethyl cellulose (Ethocel E 7, Dow Chem.), 42 parts of ethanol and 42 parts of methyl ethyl ketone are ground for 4 hours while cooling. Upon isolation of the sand from the ground product, a printing ink with very good fine distribution of the dyestuff and the masked diisocyanate is obtained. The printing ink obtained is imprinted on paper, thus providing an intermediate carrier paper suitable for the transfer printing process.

The dyestuff is transferred to polyethylene terephthalate fabric on an ironing press for 60 seconds at 200° C. A yellow print having insufficient fastness to dry heat setting is obtained. The diisocyanate compound is transferred to the resulting print for 60 seconds at 220° C. The transferred diisocyanate compound reacts with the dyestuff to give a yellow print having good fastness to dry heat setting.

What is claimed is:

1. A transfer printing process for the manufacture of prints on a textile or non-textile, hydrophobic sheet which prints are heat-fast and fast to wet processing, comprising the steps of
   (a) applying to an auxiliary carrier web a sublimable dyestuff of the formula

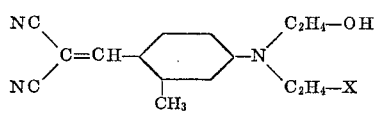

in which X represents a hydrogen or a chlorine atom or a hydroxyl or an acetoxy group,
   (b) transferring said dyestuff to said sheet by heat-induced sublimation or diffusion from said auxiliary carrier web,
   (c) subsequently providing to the printed area of said sheet an isocyanate compound, having at least two isocyanate groups per molecule, and which is capable of reacting with said dyestuff and fixing the dyestuff to the printed area of said sheet by reaction therewith.

2. A process of claim 1, wherein the sheet is a textile sheet.

3. A process of claim 2, wherein the textile sheet comprises semi-synthetic or fully synthetic fibers.

4. A process according to claim 3, wherein synthetic polyamide fibers are printed.

5. A process according to claim 3, wherein textile material from acrylic fibers is printed.

6. A process of claim 3, wherein the fiber material contains ester groups.

7. A process of claim 6, wherein the fibers are polyethylene terephthalate fibers.

8. A process of claim 1, wherein the sheet is a non-textile sheet.

9. A process of claim 8, wherein sheets are supported by another kind of fabric support are printed.

10. A process according to claim 9, wherein polyvinyl chloride is printed.

11. A process according to claim 9, wherein polyurethane is printed.

12. A process of claim 13, wherein the masked isocyanate is applied to the sheet either by padding or by a transfer of the masked isocyanate by heating process, before the dyestuff is applied thereto.

13. A process of claim 1 wherein the isocyanate compound is provided by decomposing a masked isocyanate applied to the sheet in the printed area.

14. A process of claim 13 wherein the masked isocyanate is heated to effect the decomposition thereof and liberation of the isocyanate compound.

15. A process of claim 14, wherein step (a) further comprises applying a masked isocyanate to the auxiliary carrier web and wherein step (c) is effected by applying the auxiliary carrier web to the sheet and heating the web at a temperature at least as great as that used in step (b).

16. A process of claim 15, wherein the masked isocyanate is of the formula

in which A represents a masked radical selected from the group consisting of alcohol, phenol, bisulfite, oxime, carboxylic or sulfonic amide, urethane, urea, amine carboxylic acid, active methylene compound, cyanide, and cyanamide radicals, and in which $m$ is 2, 4, or 6.

17. A process of claim 16, wherein A represents a $(H_5C_2-O-OC)_2-CH-$ or a $(C_6H_5)(CH_3)N-$ radical and $m$ is 6.

18. A process according to claim 15, wherein the masked isocyanate is of the formula

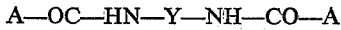

in which A has the meaning given in claim 16 and Y represents either a 1,4- or 1,3-phenylene radical which is unsubstituted or substituted by a low molecular alkyl radical or a chlorine atom, a 1,5-naphthylene or a 4,4'-diphenylmethane radical.

19. A process of claim 15, wherein step (b) is carried out under vacuum.

20. A process according to claim 13, wherein the masked isocyanate is applied to the sheet either after or simultaneously with the dyestuff.

21. A process according to claim 1, wherein step (b) is carried out under vacuum.

22. An auxiliary carrier sheet for use in heat-transfer printing, consisting of flexible sheet material carrying (1) a sublimable disperse dyestuff of the formula

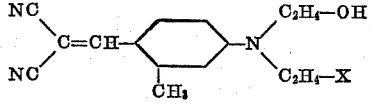

in which X represents a hydrogen or chlorine atom or a hydroxyl or acetoxy group, and (2) a masked isocyanate compound which decomposes to liberate an isocyanate, having at least two isocyanate groups per molecule, at a temperature no greater than 240° C., wherein the sublimation temperature of the dyestuff is at least 10° C. lower than the decomposition temperature of the masked isocyanate.

23. An auxiliary carrier according to claim 22, which (1) is dyed or printed with a disperse dyestuff containing hydroxyl and/or amino groups, and (2) is impregnated with a compound which splits off isocyanates at elevated temperature and has the formula

wherein A has the meaning given in claim 16, and Y is either a 1,4- or 1,3-phenylene radical which is unsubstituted or substituted by a low molecular alkyl radical or a chlorine atom, a 1,5-naphthalene radical or a 4,4'-diphenylmethane radical.

24. An auxiliary carrier sheet of claim 22, wherein the masked isocyanate is of the formula

in which A represents a masked radical selected from the group consisting of an alcohol, phenyl, bisulfite, oxime, carboxylic or sulfonic amide, urethane, urea, amine, carboxylic acid, active methylene compound, cyanide, and cyanamide radicals, and in which $m$ is 2, 4, or 6.

25. An auxiliary carrier sheet of claim 22, wherein A represents $(H_5C_2-O-OC)_2CH-$ or a

radical and $m$ is 6.

26. An auxiliary carrier sheet of claim 22, wherein the sheet material is selected from the group consisting of paper, paper provided with a silicone-layer, cellophane and metal foil.

References Cited

UNITED STATES PATENTS

| | | | |
|---|---|---|---|
| 2,862,281 | 12/1958 | Klausner | 8—115.5 |
| 3,542,775 | 11/1970 | Smith | 117—36.2 |
| 3,646,135 | 2/1972 | Coles | 117—36.2 |
| 3,232,692 | 2/1960 | Wilhelm et al. | 8—120 UX |
| 3,649,332 | 3/1972 | Dybrig | 8—2.5 |

FOREIGN PATENTS

| | | | |
|---|---|---|---|
| 696,029 | 8/1953 | Great Britain | 117—DIG. 7 |
| 975,457 | 11/1964 | Great Britain | 96—49 |
| 252,332 | 6/1964 | Australia | 8—1 C |

OTHER REFERENCES

Kosar: Photographic Science & Engineering, vol. 5, No. 4, July-August 1961.

DONALD LEVY, Primary Examiner

U.S. Cl. X.R.

8—74, 165

UNITED STATES PATENT OFFICE
CERTIFICATE OF CORRECTION

Patent No. 3,782,896     Dated January 1, 1974

Inventor(s) RAYMOND DEFAGO ET AL

It is certified that error appears in the above-identified patent and that said Letters Patent are hereby corrected as shown below:

Column 12, Claim 9, line 74, change "sheets are" to -- the sheet is --.

Column 12, Claim 9, line 75, change "are" to -- and --.

Column 13, Claim 16, line 24, change "masked" to -- masking --.

Column 14, Claim 24, line 23, change "masked" to -- masking --.

Column 14, Claim 24, line 24, change "phenyl" to -- phenol --.

Column 14, Claim 25, line 29, change "22" to -- 24 --.

Signed and sealed this 4th day of June 1974.

(SEAL)
Attest:

EDWARD M. FLETCHER, JR.
Attesting Officer

C. MARSHALL DANN
Commissioner of Patents